L. JAENICHEN.
SPRING SCALE.
APPLICATION FILED OCT. 8, 1913.
1,172,458.
Patented Feb. 22, 1916.
3 SHEETS—SHEET 1.
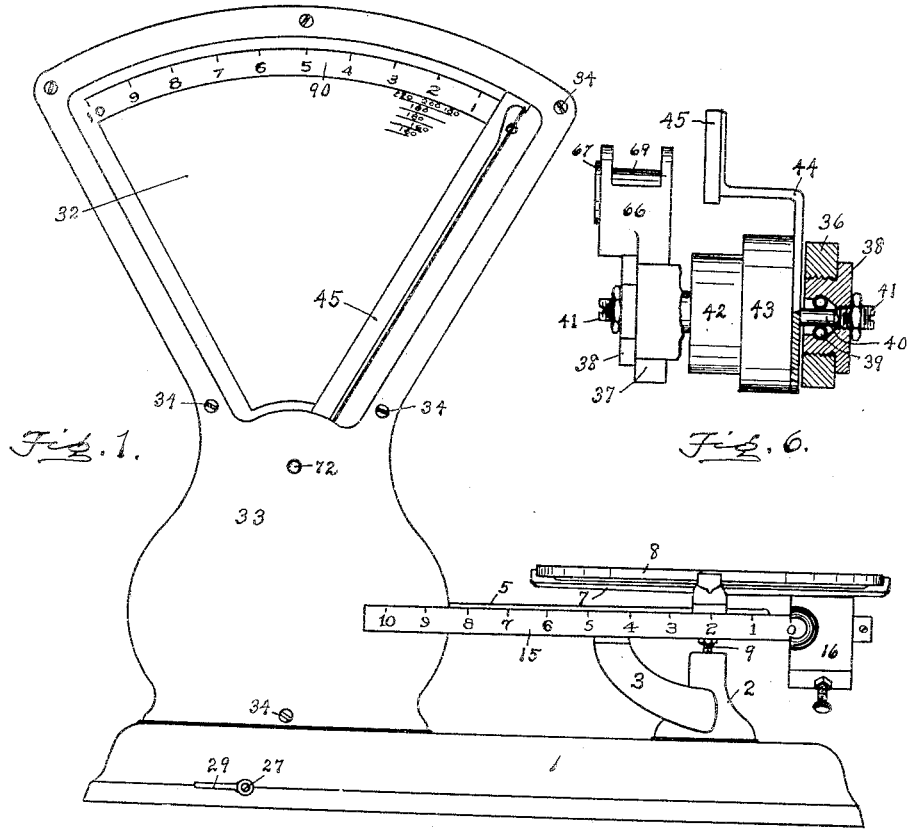
Fig. 1.
Fig. 6.
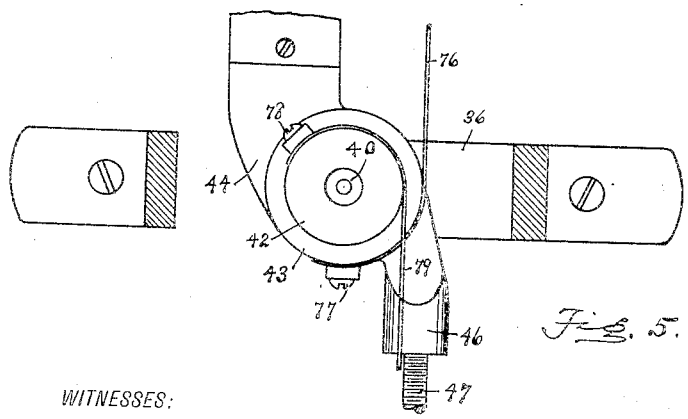
Fig. 5.
WITNESSES:
J. H. Perrault.
Hugo W. Kreinbring
INVENTOR
Louis Jaenichen.
BY
Edward N. Pagelsen,
ATTORNEY

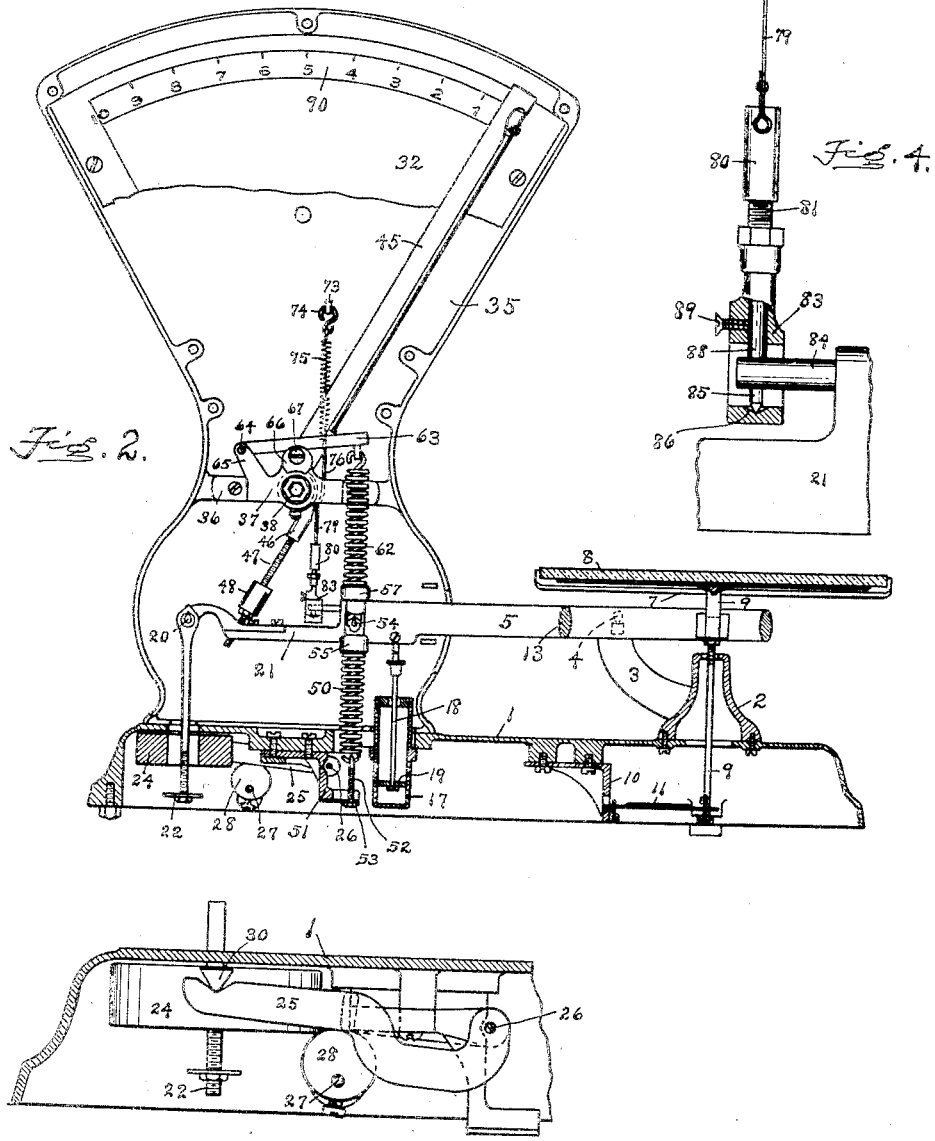

L. JAENICHEN.
SPRING SCALE.
APPLICATION FILED OCT. 8, 1913.
1,172,458.
Patented Feb. 22, 1916.
3 SHEETS—SHEET 3.
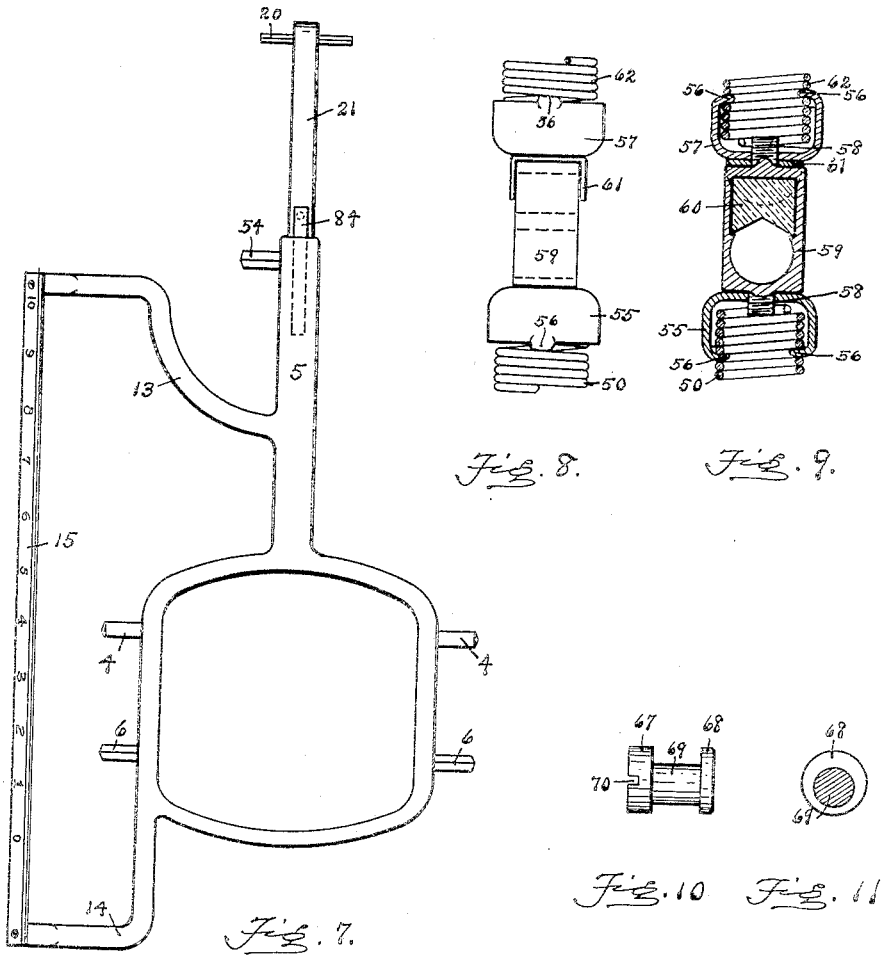

UNITED STATES PATENT OFFICE.

LOUIS JAENICHEN, OF DETROIT, MICHIGAN, ASSIGNOR TO STANDARD COMPUTING SCALE COMPANY, LIMITED, OF DETROIT, MICHIGAN, A LIMITED PARTNERSHIP.

SPRING-SCALE.

1,172,458.

Specification of Letters Patent. Patented Feb. 22, 1916.

Application filed October 8, 1913. Serial No. 794,084.

*To all whom it may concern:*

Be it known that I, LOUIS JAENICHEN, a citizen of the United States, and a resident of Detroit, in the county of Wayne and State of Michigan, have invented a new and useful Spring-Scale, of which the following is a specification.

This invention relates to scales provided with weight indicators wherein the effect of the load on the levers is resisted by means of springs, and its object is to provide a scale wherein the normal deflections of the weight indicator when the scale is unloaded because of changes of temperature will be compensated, and wherein the indicator will move equal distances for equal increments of load.

This invention consists, in combination with the base and a weighing lever pivoted thereon intermediate its ends, of a load receiver engaging one arm of the lever, and a pair of alined springs, normally under tension and having their adjacent ends connected to the other arm of said lever.

It also consists, in combination with the elements set forth, of a pivotally mounted indicator, of a pair of drums concentric with the pivot of the indicator, a flexible connector passing around one of the drums and connecting to the weighing lever, and a second flexible connector passing around the second drum and serving to return the indicator to normal position by the aid of a spring.

It further consists in forming the drum to which the lever is connected smaller than the other.

It further consists in the novel details of construction shown in the drawings and especially pointed out in the claims.

In the accompanying drawings, Figure 1 is an elevation of this improved scale. Fig. 2 is an elevation of the upper part of the scale with the front of the case removed, together with a vertical section of the base. Fig. 3 is a vertical section of the front part of the base on a larger scale. Fig. 4 is a detail of the connection between the lever and indicator. Figs. 5 and 6 are details of the indicator pivot. Fig. 7 is a plan of the weighing lever. Figs. 8 and 9 are details of the connection between the springs and the weighing lever. Figs. 10 and 11 are details of the cam for adjusting the indicator.

Similar reference characters refer to like parts throughout the several views.

On the base 1 of this scale is mounted a pedestal 2, having arms 3 which support the main pivots 4 of the weighing lever 5. A load receiver is supported on the pivots 6 of this lever, and in the present case consists of a spider 7, a plate 8, and a downwardly extending post 9 that connects to a cross bar 10 of the scale base by means of a link 11. The lever 5 has two laterally extending arms 13 and 14, which support the beam 15 on which the poise 16 is slidable.

The base may carry a dash pot 17, while a rod 18 and piston 19 for the dash pot may connect to the weighing lever. A pivot 20, on the end of the arm 21 of the weighing lever, carries the normally unloaded pendant 22. A weight 24 is normally supported by the lever 25 which is pivoted on the rod 26 that extends across the base. A second rod 27 also extends across the base and has a cam 28 secured to it in such a manner that the cam will engage the lever 25. A handle 29 on the outer end of this rod permits the operator to turn the cam 28 and permit the lever 25 to drop sufficiently to place the weight 24 on the pendant 22. This weight will preferably have the same effect as the movement of the poise 16 to the left or inner end of the beam 15. It is preferably formed with pivots 30 so that it will always be properly positioned, and is normally held up away from the pendant, as shown in Fig. 3.

Mounted on the base is a case 35, having an apertured front 33 secured in position by screws 34. A dial 32 within the case may be graduated in any desired manner. Within the case is mounted a small frame, consisting of the main or rear bar 36 and front bar 37, both furnished with thimbles 38 in which are mounted the balls 39 that constitute the bearings for the pivot shaft 40. The ends of this pivot shaft are preferably pointed, and screws 41 engaging these points prevent endwise movement of the pivot without sensibly retarding them.

Secured to the pivot shaft are the drums 42 and 43, preferably integral, and to them is secured the plate 44 carrying the indicator 45 extending in one direction, and the socket 46 for the counterweight rod 47, that extends parallel to and in the opposite direction from the indicator 45. A weight 48, on this rod, is adjustable to perfectly balance the indicator.

The effect of the load placed on the plate 8 is resisted by a spring 50 that connects at its lower end to a cross bar 51 extending across the base, by means of a rod 52, on the lower end of which is a nut 53, so that the initial height of the pivot 54 can be predetermined. The upper end of this spring screws into a cap 55 provided with a pair of fingers 56 that fit between the convolutions of the spring, as shown in Figs. 8 and 9. This cap, as well as the cap 57, screws onto the threaded cylindrical projections 58 of the small housing 59. This cap 57 also has fingers 56. Mounted in this housing is a small block 60 of agate or other hard material, held in position by means of a clip 61. A second spring 62 extends upwardly from the lever 5 and connects to a small lever 63, pivoted at 64 on an arm 65 that extends upwardly from the front bar 37 of the bracket just described. Extending upwardly from the front bar 37 is a small housing 66 in which is mounted a cam, which is more clearly shown in Figs. 10 and 11, and which consists of two cylindrical heads 67 and 68 united by means of an eccentric cylindrical portion 69. The head 67 may be formed with a nick 70 so that this cam can be turned by means of a screwdriver inserted through a hole 72 in the front plate of the case, as shown in Fig. 1.

The length and stiffness of the springs 50 and 62 are the same, and when the scale is assembled as shown in the drawings, these two springs are under tension. When it is desired to move the indicator toward the right or left, the cam is turned so as to raise or lower respectively the lever 63, thereby raising or lowering respectively the pivot 54 on the main lever of the scale. Such movement of the upper end of the spring 62 will have a tendency to change the tension of both of the springs to a similar degree, and will therefore have no effect on the action of these springs with respect to a load placed on the platform 8.

An arm 73 may extend from the back of the case and furnish the support for a hook 74 to which is connected a spring 75, as shown in Fig. 2. To the lower end of this spring a flexible connector 76 is attached, which connector is preferably a very thin ribbon of steel whose lower end is secured to the drum 43 by means of a screw 77. A screw 78 attaches the upper end of the flexible connector 79 to the drum 42, as shown in Fig. 5. As shown in Fig. 4, the lower end of this connector is attached to a sleeve 80, which sleeve screws onto a bolt 81 carried by the yoke 83. A rod 84 extends from the arm 21 of the main scale lever and carries a downwardly extending pivot pin 85 that enters a depression 86 in the lower cross bar of the yoke 83. A rod 88 is slidably mounted in this yoke 83 and can be raised so as to permit the pivot 85 entering the chamber in this yoke, but after the pin is positioned, this rod is permitted to slide down so as to prevent displacement, and a screw 89 may be employed to hold this rod in position.

The graduated scale 90 of the dial-plate is preferably graduated for as many pounds or divisions of weight as is the beam 15, and the highest characters of each of these preferably indicate the same load on the platform 8 as will be counterbalanced by the weight 24. If a load is placed on the platform 8, the left end of the lever 5 (Fig. 2) will rise and extend the spring 50, at the same time permitting the spring 62 to contract. The stiffness of these springs will be such that the indicator will travel over as many subdivisions of the scale 90 as are necessary to indicate the load on the platform 8. This indicator is compelled to turn by means of the spring 75.

The two springs 50 and 62 being of equal length and stiffness, changes in temperature will have the same effect on both, and as they will vary equally under such changes, the position of the indicator will not be affected thereby, so that when this indicator has been set to zero by means of the adjusting device shown in Fig. 10, and its action on the lever 63, the indicator will remain at zero throughout all the different changes in temperature, so long as the scale is unloaded. Whenever a weight is placed on the platform 8 at the temperature at which the scale is sealed, it will cause a certain upward pressure of the pivot 54 upon the block 59 of agate, and together with the pull of the spring 62, heretofore counterbalanced, will cause the spring 50 to extend. When this same weight is placed upon this platform at lower temperatures than that at which the scale was sealed, the upward pressure of the pivot 54 will be met by a stiffer spring 50 but will be assisted by a stiffer spring 62. As a result, the changes of temperature which usually affect the springs of spring scales, will not have the same effect upon the present construction. By means of the double drums 42 and 43 on the shaft of the indicator, the movement of the indicator will always be in direct proportion to the movement of the main weighing lever of the scale, and by reason of the larger drum 43, the movement of the very active spring 75 is permitted to be comparatively great for this type of scale.

Aside from the connection between the yoke 83 and the pivot 85, the construction of the base, the lever 5 and the load receiver forms no part of the present invention. Neither does the indicator chart nor the case supporting the same. The invention resides entirely in the construction and connections of the springs 50 and 62 with the pivot 54 of the main lever, in the tensioning device for the upper end of the spring 62 and in the pivot shaft and its drums 42 and 43 and the connections between said drums and the main weighing lever and with the spring 75. The details of construction of this scale may all be changed by those skilled in the art without departing from the spirit of my invention.

I claim.

1. In a scale, the combination of a base, a main weighing lever mounted intermediate its ends on the base, a load receiver connected to one arm of the lever, a pivot extending from the opposite arm, a housing mounted on the pivot and having a bearing engaging the pivot and cups at opposite ends of the housing, said cups having inwardly extending fingers at their edges alined vertical springs extending in opposite directions from said housing, means to secure the lower end of the lower spring, adjustable means to secure the upper end of the upper spring comprising an arm and an eccentric to position said arm, and an indicator connected to said lever.

2. In a scale, the combination of a base, a main weighing lever mounted intermediate its ends on the base, a load receiver connected to one arm of the lever, a pivot extending from the opposite arm, a housing mounted on the pivot and having a bearing engaging the pivot, alined vertical springs extending in opposite dirctions from said housing, means to secure the lower end of the lower spring, adjustable means to secure the upper end of the upper spring comprising an arm and an eccentric to position said arm, and an indicator connected to said lever.

3. In a scale, the combination of a base, a main weighing lever mounted intermediate its ends on the base, a load receiver connected to one arm of the lever, a pivot extending from the opposite arm, a housing mounted on the pivot and having a bearing engaging the pivot and cups at opposite ends of the housing, said cups having inwardly extending fingers at their edges, alined vertical springs extending in opposite directions from said housing, means to secure the lower end of the lower spring, and the upper end of the upper spring, and an indicator connected to said lever.

4. In a scale, the combination of a base, a main weighing lever mounted thereon, a pair of alined springs extending in opposite directions from said lever, means to secure the outer end of one of said springs comprising an arm and an eccentric to position said arm, means to secure the outer end of the other spring, and an indicator connected to said lever.

In testimony whereof I have signed this specification in the presence of two subscribing witnesses.

LOUIS JAENICHEN.

Witnesses:
EDWARD N. PAGELSEN,
HUGO W. KREINBRING.